(12) United States Patent
Foust

(10) Patent No.: US 7,484,618 B2
(45) Date of Patent: Feb. 3, 2009

(54) CONVEYOR FOR HOT MATERIALS

(76) Inventor: Jerry D. Foust, P.O. Box 537, Caryville, TN (US) 37714

( * ) Notice: Subject to any disclaimer, the term of this patent is extended or adjusted under 35 U.S.C. 154(b) by 79 days.

(21) Appl. No.: 11/202,585

(22) Filed: Aug. 12, 2005

(65) Prior Publication Data

US 2007/0034483 A1  Feb. 15, 2007

(51) Int. Cl.
  *B65G 15/30* (2006.01)
  *B65G 15/00* (2006.01)
(52) U.S. Cl. .................... 198/844.1; 198/847; 198/846; 198/844.2
(58) Field of Classification Search ............ 198/844.1, 198/844.2, 846, 847
See application file for complete search history.

(56) References Cited

U.S. PATENT DOCUMENTS

| 2,310,819 | A | * | 2/1943 | Van Orden | 198/847 |
| 3,122,934 | A | | 3/1964 | Fihe | 474/261 |
| 3,415,700 | A | * | 12/1968 | Webster | 156/164 |
| 3,593,840 | A | * | 7/1971 | Guyer | 198/847 |
| 3,900,627 | A | * | 8/1975 | Angioletti et al. | 428/114 |
| 4,224,370 | A | | 9/1980 | Heinemann | 442/65 |
| 4,411,947 | A | | 10/1983 | Heynhold | 442/228 |
| 4,674,622 | A | | 6/1987 | Utsunomiya et al. | 198/500 |
| 5,840,635 | A | | 11/1998 | Bertotto | 442/270 |
| 5,938,007 | A | * | 8/1999 | Fujihiro et al. | 198/847 |
| 6,837,366 | B2 | * | 1/2005 | Nishikita | 198/847 |
| 2004/0140180 | A1 | | 7/2004 | Kerwel et al. | 198/847 |

* cited by examiner

*Primary Examiner*—Gene Crawford
*Assistant Examiner*—Kavel P Singh
(74) *Attorney, Agent, or Firm*—Alfred J. Mangels

(57) ABSTRACT

A conveyor belt having a longer effective operating life when continuously conveying hot materials of the order of from about 300° F. to about 330° F. and without the need for premature production line shutdowns for belt shortening and resplicing. The belt includes woven upper and lower cotton fiber layers and two intermediate layers of woven polyester fibers. The layers are held together in face-to-back relationship with rubber skim that is subsequently vulcanized. The upper and lower cotton layers are structured to provide heat insulation for the inner polyester fibers.

14 Claims, 3 Drawing Sheets

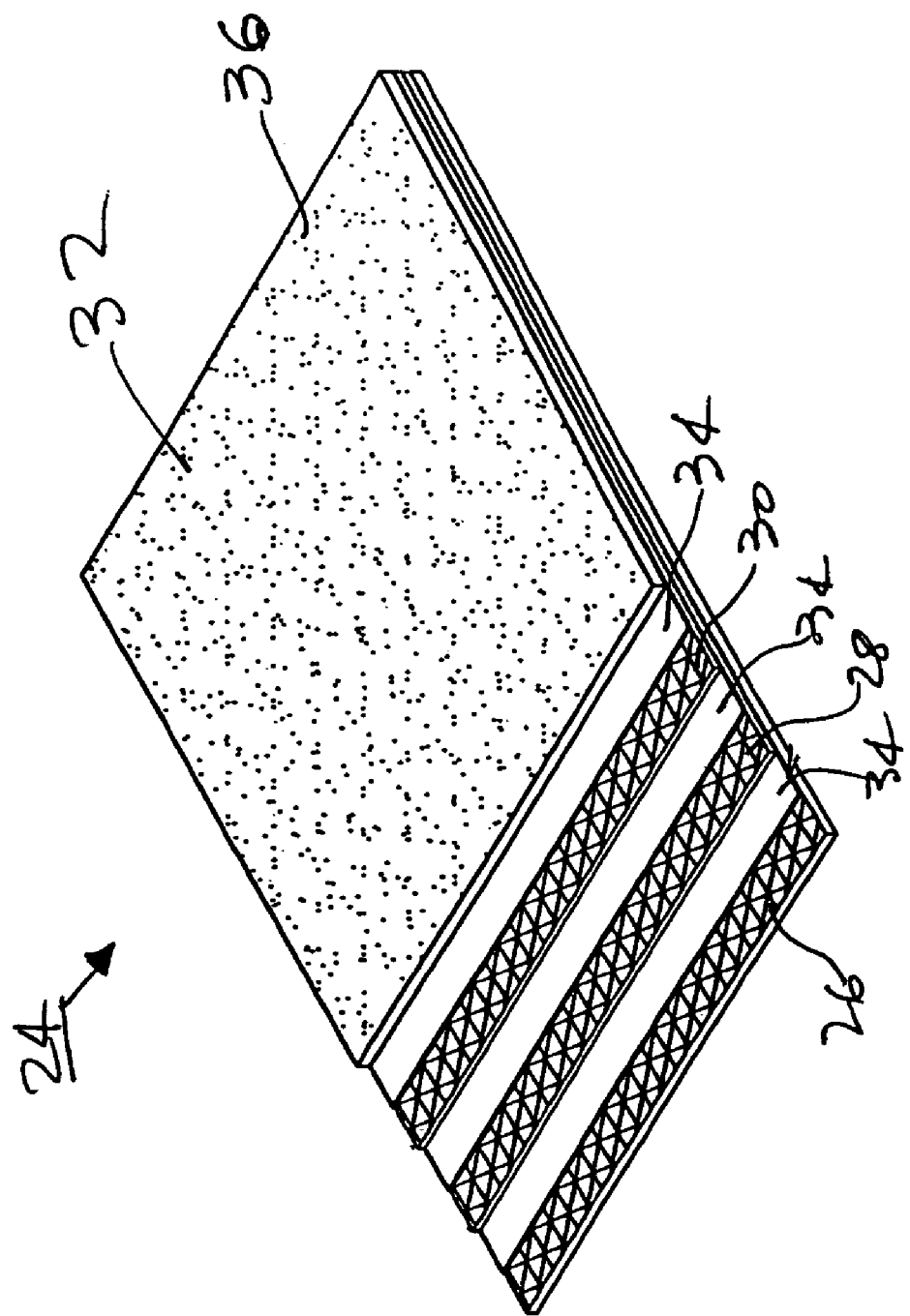

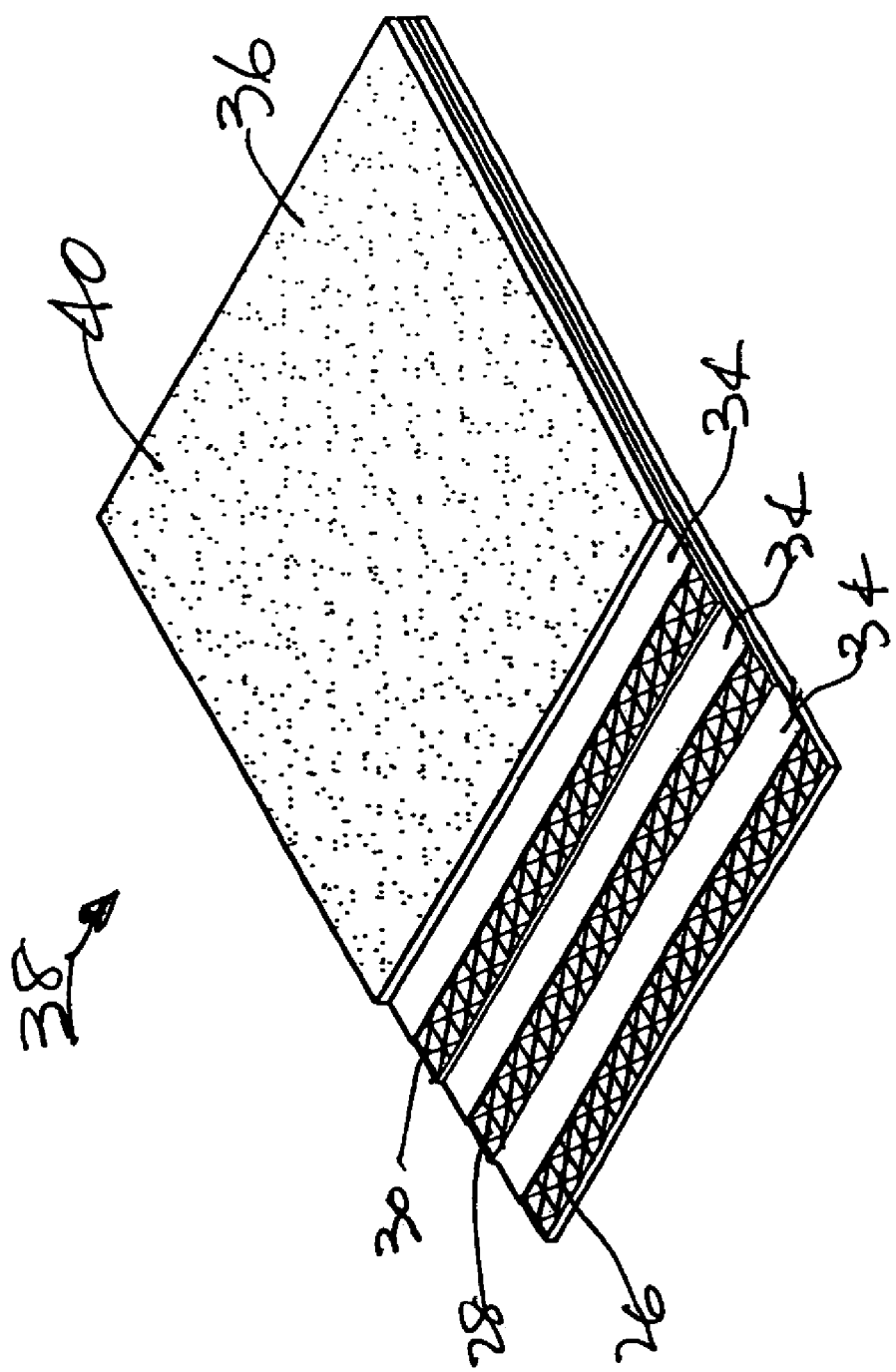

CONVEYOR FOR HOT MATERIALS

BACKGROUND OF THE INVENTION

1. Field of the Invention

The present invention relates to a flexible, non-metallic conveyor belt structure for a conveyor belt that carries materials or items between adjacent stations in a sequentially-based processing system. More particularly, the present invention relates to a flexible, non-metallic conveyor belt structure for conveying hot, tacky materials and that provides greater resistance to longitudinal stretching of the belt structure when subjected to heat that is transferred to the belt from the heated material being conveyed.

2. Description of the Related Art

Flexible conveyor belts formed from several layers of woven fabrics that are embedded in a rubber matrix are well known. Typical fabric materials include cotton, cotton/polyester, and other polymer-based yarns that are woven to define generally rectangular layers or plies of the belt. Rubber skim is provided between the fabric layers and also on the upper and lower surfaces of the belt material to cover and enclose the inner layers of fabric. The rubber is subjected to a vulcanization process, and the longitudinal ends of the belt material are spliced together to form an endless loop that is adapted to pass around a pair of spaced, parallel drums or rollers, at least one of which is a driven drum or roller, to define a conveying path for the materials or articles that are to be conveyed.

Many of the known belt structures are intended to convey materials or articles that are not heated to a significant degree. However, when hot materials are conveyed, the tensile loads applied by the belt drive mechanism to common, commercially available conveyor belt structures are such that the belts tend to stretch longitudinally. Longitudinal stretching results in loosening of the belt relative to the drums or rollers around which or over which the belt passes.

When a conveyor belt becomes loose as a result of longitudinal stretching of the belt, an adjustment must be made to the belt in order for the belt to continue to be under tension, so it can be driven by the belt drive mechanism. One possible type of adjustment involves increasing the relative spacing of the belt drive drums or rollers to accommodate the longer belt loop length. Another possible type of adjustment involves shortening of the belt length in order to maintain the belt tension that is needed to provide the required degree of surface-to-surface contact force between the belt and the belt drive system for continued belt movement in the desired direction.

Drum or roller spacing adjustment requires displacing the parallel axes of the drums or rollers away from each other. The displacement is needed in order to maintain firm surface contact of the belt on the drums or rollers, and thereby maintain sufficient belt tension so that the belt continues to be driven and to move in the desired direction to convey the materials or articles of interest. However, drum or roller axis displacement is not practical in many cases because the belt drive system is generally fixed in relation to the floor, or is fixed relative to other structural elements of the conveyor system.

The other way to overcome the effects of belt stretching when conveyor belts are subjected to high temperatures by virtue of carrying hot materials is to reduce the longitudinal length of the stretched belt to substantially its original length. The intent is to eliminate the additional belt length that is caused by the stretching of the belt material. The belt length is reduced by cutting a portion of the belt material so that the belt is again substantially at its initial longitudinal length, and then resplicing the belt by connecting together by known methods the belt ends that result from the belt cutting operation. However, resplicing of a stretched belt requires that the production line in which the conveyor belt is located be stopped, that the belt be removed from the conveyor system, that a section be cut from the belt, that the belt ends at the cuts be respliced, and that the belt then be reinstalled on the conveyor drive system drums or rollers. The resplicing operation results in undesired down time for the production line involved, reducing the output of the line, and thereby increasing the costs of the production operation.

In the production of rubber products, such as automobile tires and other molded rubber items, hot, tacky rubber is required to be transported between production stations on a continuous, around-the-clock basis. The temperature of the rubber material being conveyed can typically range from about 300° F. to about 330° F. Conventional cotton/polyester fabric-based conveyor belts that have been utilized in such high temperature rubber processing operations have been found to have a limited effective operating life, of the order of only about 12 weeks or so. Moreover, and significantly, such conventional belts stretch during use under those high temperature processing conditions. Typically, at least one and sometimes two belt splicings are required during that 12 week time span in order to shorten the belts by reducing their longitudinal length so that they can continue to be used. But each of the splicing operations require an undesirable production line shutdown, which causes expensive production line downtime affecting the entire production operation for the tires or other rubber products that are being produced.

There is therefore a need for an improved conveyor belt structure that exhibits greater resistance to longitudinal stretching when carrying hot, tacky materials, and that provides a longer effective belt operating lifetime with fewer production line shutdowns.

SUMMARY OF THE INVENTION

Briefly stated, in accordance with one aspect of the present invention, a conveyor belt structure is provided for conveying hot, tacky materials. The belt includes a lower cotton fabric layer, a first intermediate fabric layer formed from polyester fibers and overlying the lower cotton fiber layer, a second intermediate fabric layer formed from polyester fibers and overlying the first intermediate fabric layer, and an upper cotton fabric layer overlying the second intermediate fabric layer. The upper fabric layer includes an upwardly-facing surface for receiving material to be conveyed by the belt, and onto which a layer of silicone-based release material is applied to minimize adhesion of conveyed material to the upper fabric layer.

The adjacent layers of the belt structure are joined together by a rubber-based joinder material that is vulcanized to firmly bind together the adjacent layers to form a unitary belt structure. The belt conveys hot material having a temperature greater than about 300° F. without substantial stretching.

BRIEF DESCRIPTION OF THE DRAWINGS

The structure, operation, and advantages of the present invention will become further apparent upon consideration of the following description, taken in conjunction with the accompanying drawings in which:

FIG. 2 is a fragmentary perspective view of an embodiment of an improved conveyor belt for conveying hot materials, showing the relative positions of the components of the improved belt; and FIG. 3 is a fragmentary perspective view of another embodiment of an improved conveyor belt for conveying hot materials and showing the relative positions of the components of the improved belt.

DESCRIPTION OF THE PREFERRED EMBODIMENTS

Figure 1:
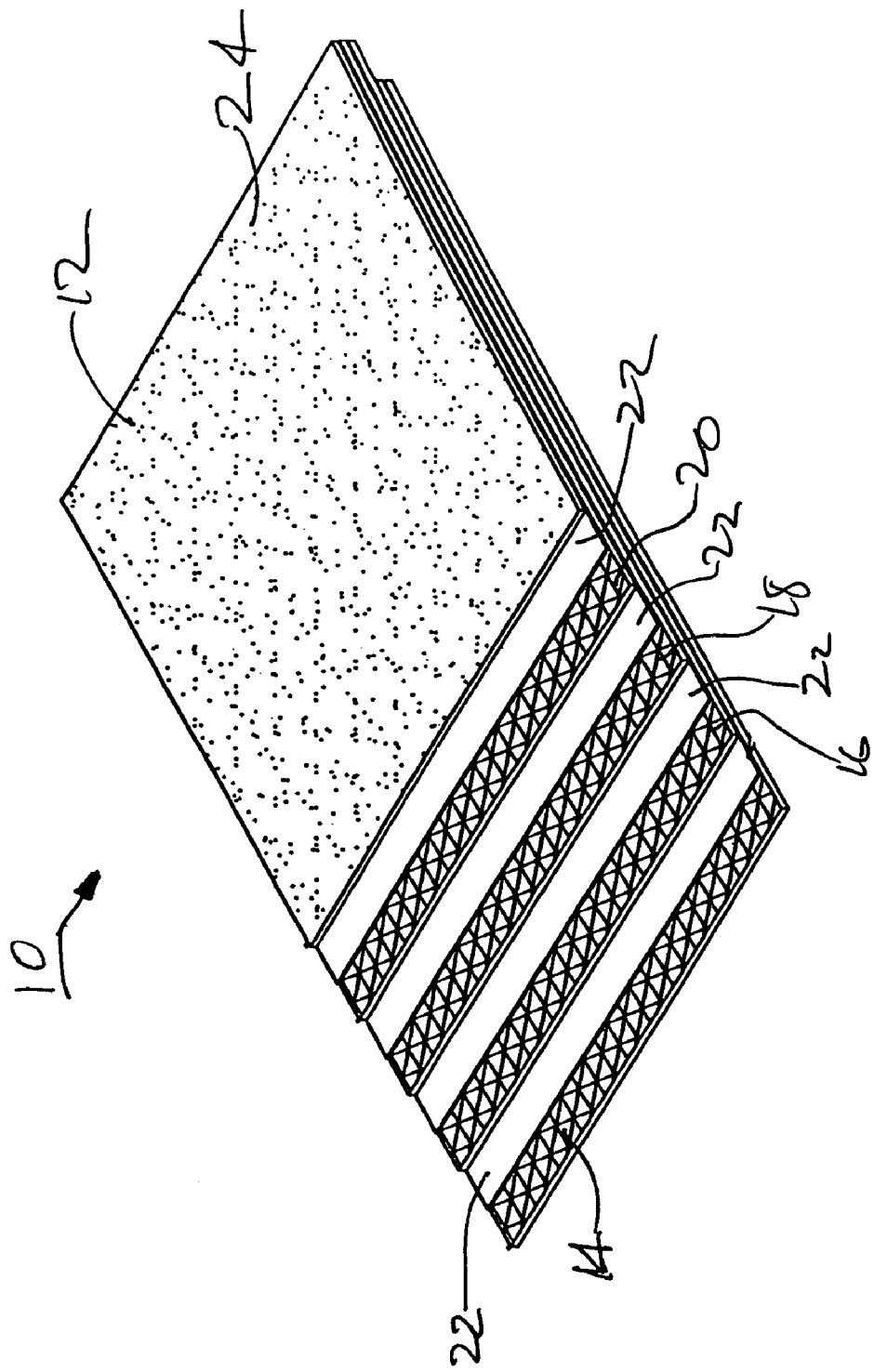
FIG. 1 is a fragmentary perspective view of a known conveyor belt showing the relative positions of the components of the belt.

Referring now to the drawings, and particularly to FIG. 1 thereof, there is shown the overall structure of one form of known conveyor belt 10. The belt includes an outer cotton fabric layer 12 and an inner cotton fabric layer 14. The outer layer is the surface on which the materials to be conveyed are carried, and the inner layer is the surface that contacts drive and idler rollers that form part of the conveyor drive system.

Positioned between outer cotton layer 12 and inner cotton layer 14 are three inner plies 16, 18, 20 of a cotton fabric or a cotton/polyester fabric material. The adjacent inner plies and the outer and inner cotton layers are joined by intervening layers of a rubber skim bonding material 22 that is thereafter vulcanized to provide a unitary conveyor belt structure. Outer cotton layer 12 includes on its outwardly-facing surface a thin layer 24 of silicone material to minimize adhesion of materials to the outer surface of belt 10. The overall structure of belt 10 is such that the tensile loads imposed on the belt are distributed throughout the belt structure so that each of outer and inner cotton fabric layers 12, 14 and each of inner plies 16, 18, 20 is subjected to significant tensile stress.

Conveyor belts having the structure shown in FIG. 1 and formed from the components described above have resulted in a shorter than desired effective operating life of such belts when they are utilized to convey hot materials, such as hot rubber in rubber processing production lines. The temperature of the hot rubber material in such operations is generally of the order of about 300° F. and can range up to about 330° F. During extended exposure to such temperatures, and when also under the belt tension that is needed to provide sufficient frictional contact with the drums or rollers forming part of the belt drive system, those known belt structures soon stretch to the point that the belts either must be replaced or must be shortened and then respliced. The stretching results from the tensile loading of the several layers and from the relatively low tensile strength of the inner and outer cotton fabric layers, as well as that of the inner cotton or polyester/cotton layers that are generally utilized.

In the case of belt removal for installation of a new belt, or in the case of belt removal for shortening, the need to remove the conveyor belt results in production line shutdown during the time the belt either is completely replaced or is shortened and respliced, which results in costly down time that increases production costs. Because many such rubber production operations are intended to operate continuously on a 24 hour basis, any production line down time is undesirable. In some instances in connection with the conveying of hot rubber material, the known belt structures of the type shown in FIG. 1 have exhibited an overall operating life of only about 12 weeks, and during that time one or two belt resplicings were required in order to permit continued use of the belt.

The present invention is directed to providing an improved conveyor belt structure that exhibits a longer effective operating life when conveying hot, tacky materials having a temperature of the order of about 300° F. and up to about 330° F. One embodiment of an improved conveyor belt structure for carrying such hot materials and having a longer effective operating life than the FIG. 1 belt structure is shown in FIG. 2. Beginning from the lower side of belt 24, the side that faces the conveyor drive system drive and idler drums or rollers, an inner woven cotton fabric base layer 26 is provided for heat resistance, to protect the belt by limiting the transfer of heat to the belt from sources below the belt when it is in use. Base layer 26 is a leno weave, open end cotton sheet having a weight of from about 29.0 oz/yd$^2$ to about 31.0 oz/yd$^2$, a thickness of from about 0.067 inches to about 0.73 inches, and having a plain weave selvage and a greige finished condition.

Base layer 26 includes a plurality of cotton warp yarns extending in the longitudinal direction of the belt structure and comprising 72.90% of the cotton fabric structure and having the following physical properties:

6 cotton yarns of 6.5 denier;
twist of from 3.2 to 3.8 twists per inch;
tensile strength of at least about 620 psi;
crimp of from 24.0% to 26.0%; and
from 28.5 to 30.5 ends per inch.

Base layer 26 also includes a plurality of weft fill cotton yarns extending in the transverse direction of the belt structure and comprising 27.10% of the cotton fabric structure and having the following physical properties:

5 cotton yarns of 6.5 denier;
twist of from 3.2 to 3.8 twists per inch;
tensile strength of at least about 260 psi;
crimp of from 1.5% to 2.5%; and
from 15.5 to 16.5 ends per inch.

The structure of cotton base layer 26 provides a relatively dense, tightly woven cotton sheet that serves as an effective thermal insulator for protecting the inner belt structure from excessive heat. It thereby limits heat transfer to the inner belt structure from heat sources that face the outwardly-facing surface of base layer 26, such as heat from adjacent rollers, drums, drive motors, and the like Positioned above cotton base layer 26 are two plies 28, 30 of woven fabric consisting solely of polyester yarns, such as, for example, polyesterterephthalate. Each of polyester fabrics 28, 30 has a thickness of from about 0.032 inches to about 0.036 inches, a weight of from about 17.6 oz/yd$^2$ to about 19.6 oz/yd$^2$, and a heat sealed selvage. Polyester fabric plies 28, 30 include a plurality of warp yarns extending in the longitudinal direction of the belt structure and having the following physical properties:

2 polyester yarns of 1000 denier;
twist of from 1.5 to 2.5 twists per inch;
tensile strength of at least about 1090 psi;
crimp of from 3.0% to 7.0%; and
about 35.3 ends per inch.

Polyester fabric plies 28, 30 also include a plurality of weft or fill yarns extending in the transverse direction of the belt structure and having the following physical properties:

4 polyester yarns of 1000 denier;
twist of from 1.5 to 2.5 twists per inch;
tensile strength of at least about 700 psi;
crimp of from 2.0% to 6.0%; and
about 12.0 ends per inch.

Polyester fabric plies 28, 30 provide the tensile-load-carrying layers of the novel conveyor belt structure for hot materials having a temperature of the order of about 300° F. or more. And although polyester yarns generally have relatively high room temperature tensile strength, and they therefore generally resist significant stretching at room temperature and temperatures up to about 250° F., the stress-creep characteristics of polyester yarns at temperatures of the order of about 300° F. or more is such that they would not normally be used alone in a conveyor belt structure intended to transport high temperature materials. And it is why the conventional conveyor belts have included cotton/polyester inner plies. Thus polyester yarns would be contraindicated for such a conveying operation, because one would not therefore normally utilize such material in such a high temperature environment.

A protective upper cotton layer 32 overlies the uppermost polyester fabric ply 30. Upper cotton layer 32 has the same structure and yarn physical properties as those of base layer 26, except that upper layer 32 has a higher percentage crimp of the warp yarns, about 20% higher, than does base layer 26. Instead of the base sheet percentage crimp of from about 24.0% to about 26.0%, upper sheet has a percentage crimp of from about 29.0% to about 31.0%. The extra crimp provided in the warp yarns of upper cotton layer 32 allows the upper layer to shrink somewhat when exposed to a hot material, while at the same time remaining sufficiently flexible to resist yarn rupture that would lead to belt failure. Additionally, the described structure of upper cotton layer 32 provides a sufficient thermal insulation effect to protect inner polyester plies 28, 30 from the high temperatures of the conveyed materials. Upper cotton layer 32 thus serves to minimize the thermal effect of the high temperature materials on the polyester fabric ply stress, and thereby minimizes the thermally-induced elongation of the polyester plies of the new belt structure when it is under tensile stress and at temperatures above about 250° F.

Each of cotton base layer 26, inner polyester plies 28, 30, and upper cotton layer 32 are joined to their adjacent layers or plies by a rubber skim 34 that is provided between the respective layers and plies of the belt structure. After assembly of the layers with the intervening rubber skim, the rubber skim is vulcanized to provide a strong bond between the respective layers of the resulting novel, high-temperature belt structure.

After vulcanization, the outwardly-facing surface of upper cotton layer 32 has applied to it a silicone material layer 36 to minimize the adhesion of tacky materials to the upper cotton layer defining the belt upper surface that carries the materials to be conveyed. Silicone layer 36 has a thickness of about 0.002 inches. A suitable silicone material can be obtained from Wacker Chemicals USA, Inc., of Adrian, Mich., or from Dow Corning Corp., of Midland, Mich.

Another embodiment of an improved conveyor belt structure for conveying hot materials having a temperature of the order of about 300° F. or more is shown in FIG. 3. Belt 38 of the FIG. 3 embodiment is structurally similar to the FIG. 2 embodiment in that it includes the same number of layers and plies of the same basic materials. However, upper cotton layer 40 of the FIG. 3 embodiment is formed from all ring spun cotton yarn. The use of ring spun cotton yarn results in an increase in the strength properties of the FIG. 3 upper cotton sheet as compared with the FIG. 2 upper cotton sheet. It also provides a tighter upper cotton layer for improved heat insulation properties to further protect inner polyester plies 28, 30 from the high temperatures of the hot materials. Additionally, upper cotton layer 40 includes a double thickness of silicone material, a thickness of about 0.004 inches as compared with the silicone layer thickness on the corresponding cotton layer of the FIG. 2 embodiment.

It will be apparent that the disclosed improved belt structures provide a significant improvement over existing structures. Indeed, in addition to a longer effective operating life, as compared with the previously-available belt structure shown in FIG. 1 and described above, the belt structures in accordance with the present invention, as shown in FIGS. 2 and 3 and as herein described have resulted in longer effective operating life of the belts by virtue of not having required as frequent production line shutdowns for belt shortening and resplicing. Belts having the improved structure have operated to transport hot rubber compounds having temperatures of the order of from about 300° F. to about 330° F. continuously for periods of from 14 to 16 weeks, and without the need for production line shutdown for belt shortening and resplicing. The improved belt structures also have exhibited reduced belt camber, which facilitates the longitudinal splicing together of belt structures to provide belts of greater width than can be produced normally.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A conveyor belt structure for conveying heated, tacky materials, said belt comprising:
   a) a lower woven cotton fabric layer;
   b) a first intermediate fabric layer formed solely of woven polyester yarns and overlying the lower cotton fiber layer;
   c) a second intermediate fabric layer formed solely of woven polyester yarns and overlying the first intermediate fabric layer;
   d) an upper woven cotton fabric layer overlying the second intermediate fabric layer, wherein the upper fabric layer includes an upwardly-facing surface for receiving material to be conveyed by the belt, the upwardly-facing surface including a layer of silicone-based release material to minimize adhesion of conveyed material to the upper fabric layer;
   e) wherein adjacent layers are joined together by a rubber-based joinder material that is vulcanized to firmly bind together the adjacent layers to form a unitary belt structure, wherein each of the intermediate fabric layers positioned between the upper and lower cotton fabric layers is formed solely of woven polyester yarns, and wherein the belt conveys heated materials having a temperature greater than 300° F. without substantial stretching, wherein the intermediate woven polyester fabric layers have a thickness of from 0.032 inches to 0.036 inches, a weight of from 17.6 oz/yd$^2$ to 19.6 oz/yd$^2$, and a heat sealed selvage.

2. A conveyor belt in accordance with claim 1, wherein the polyester fabric includes longitudinally-extending warp yarns formed from 2 polyester yarns of 1000 denier and having a twist of from 1.5 to 2.5 twists per inch; wherein the warp yarns have a tensile strength of at least 1090 psi, a crimp of from 3.0% 7.0%; and wherein the warp yarns are present at 35.3 ends per inch.

3. A conveyor belt in accordance with claim 1, wherein the polyester fabric includes transversely-extending fill yarns formed from 4 polyester yarns of 1000 denier and having a twist of from 1.5 to 2.5 twists per inch; wherein the fill yarns have a tensile strength of at least about 700 psi, a crimp of from 2.0% to 6.0%; and wherein the fill yarns are present at 12.0 ends per inch.

4. A conveyor belt structure for conveying heated, tacky materials, said belt comprising:

a) a lower woven cotton fabric layer;
b) a first intermediate fabric layer formed solely of woven polyester yarns and overlying the lower cotton fiber layer;
c) a second intermediate fabric layer formed solely of woven polyester yarns and overlying the first intermediate fabric layer;
d) an upper woven cotton fabric layer overlying the second intermediate fabric layer, wherein the upper fabric layer includes an upwardly-facing surface for receiving material to be conveyed by the belt, the upwardly-facing surface including a layer of silicone-based release material to minimize adhesion of conveyed material to the upper fabric layer;
e) wherein adjacent layers are joined together by a rubber-based joinder material that is vulcanized to firmly bind together the adjacent layers to form a unitary belt structure, wherein each of the intermediate fabric layers positioned between the upper and lower cotton fabric layers is formed solely of woven polyester yarns, and wherein the belt conveys heated materials having a temperature greater than 300° F. without substantial stretching, wherein each of the upper and lower woven cotton fabric layers is a leno weave, open end cotton sheet having a weight of from 29.0 oz/yd$^2$ to 31.0 oz/yd$^2$, a thickness of from 0.067 inches to 0.73 inches, and having a plain weave selvage and a greige finished condition.

5. A conveyor belt in accordance with claim 4, wherein the lower woven cotton fabric includes cotton warn yarns extending in a longitudinal direction of the belt structure and comprising 72.90% of the cotton fabric structure and having 6 cotton yarns of 6.5 denier; a twist of from 3.2 to 3.8 twists per inch; a tensile strength of at least 620 psi; a crimp of from 24.0% to 26.0%; and from 28.5 to 30.5 ends per inch.

6. A conveyor belt in accordance with claim 4, wherein the lower woven cotton fabric includes cotton fill yarns extending in a transverse direction of the belt structure and comprising 72.90% of the cotton fabric structure and having 6 cotton yarns of 6.5 denier; a twist of from 3.2 to 3.8 twists per inch; a tensile strength of at least 620 psi; a crimp of from 24.0% to 26.0%; and from 28.5 to 30.5 ends per inch.

7. A conveyor belt in accordance with claim 4, wherein the upper woven cotton fabric includes cotton warp yarns extending in a longitudinal direction of the belt structure and comprising 72.90% of the cotton fabric structure and having 6 cotton yarns of 6.5 denier; a twist of from 3.2 to 3.8 twists per inch; a tensile strength of at least 620 psi; a crimp of from 29.0% to 31.0%; and from 28.5 to 30.5 ends per inch.

8. A conveyor belt in accordance with claim 7, wherein the upper woven cotton fabric includes cotton fill yarns extending in a transverse direction of the belt structure and comprising 72.90% of the cotton fabric structure and having 6 cotton yarns of 6.5 denier a twist of from 3.2 to 3.8 twists per inch; a tensile strength of at least 620 psi; a crimp of from 24.0% to 26.0%; and from 28.5 to 30.5 ends per inch.

9. A conveyor belt structure for conveying heated, tacky materials, said belt comprising:
a) a lower woven cotton fabric layer;
b) a first intermediate fabric layer formed solely of woven polyester yarns and overlying the lower cotton fiber layer;
c) a second intermediate fabric layer formed solely of woven polyester yarns and overlying the first intermediate fabric layer;
d) an upper woven cotton fabric layer overlying the second intermediate fabric layer, wherein the upper fabric layer includes an upwardly-facing surface for receiving material to be conveyed by the belt, the upwardly-facing surface including a layer of silicone-based release material to minimize adhesion of conveyed material to the upper fabric layer;
e) wherein adjacent layers are joined together by a rubber-based joinder material that is vulcanized to firmly bind together the adjacent layers to form a unitary belt structure, wherein each of the intermediate fabric layers positioned between the upper and lower cotton fabric layers is formed solely of woven polyester yarns, and wherein the belt conveys heated materials having a temperature greater than 300° F. without substantial stretching, wherein the polyester yarns are polyesterterephthalate.

10. A conveyor belt in accordance with claim 2, wherein the polyester yarns are polyesterterephthalate.

11. A conveyor belt in accordance with claim 3, wherein the polyester yarns are polyesterterephthalate.

12. A conveyor belt in accordance with claim 5, wherein the polyester yarns are polyesterterephthalate.

13. A conveyor belt in accordance with claim 6, wherein the polyester yarns are polyesterterephthalate.

14. A conveyor belt in accordance with claim 8, wherein the polyester yarns are polyesterterephthalate.

* * * * *